L. V. STOELTZLEN.
FUEL AND STARTING VALVE FOR INTERNAL COMBUSTION ENGINES.
APPLICATION FILED NOV. 7, 1912.
1,118,379.
Patented Nov. 24, 1914.
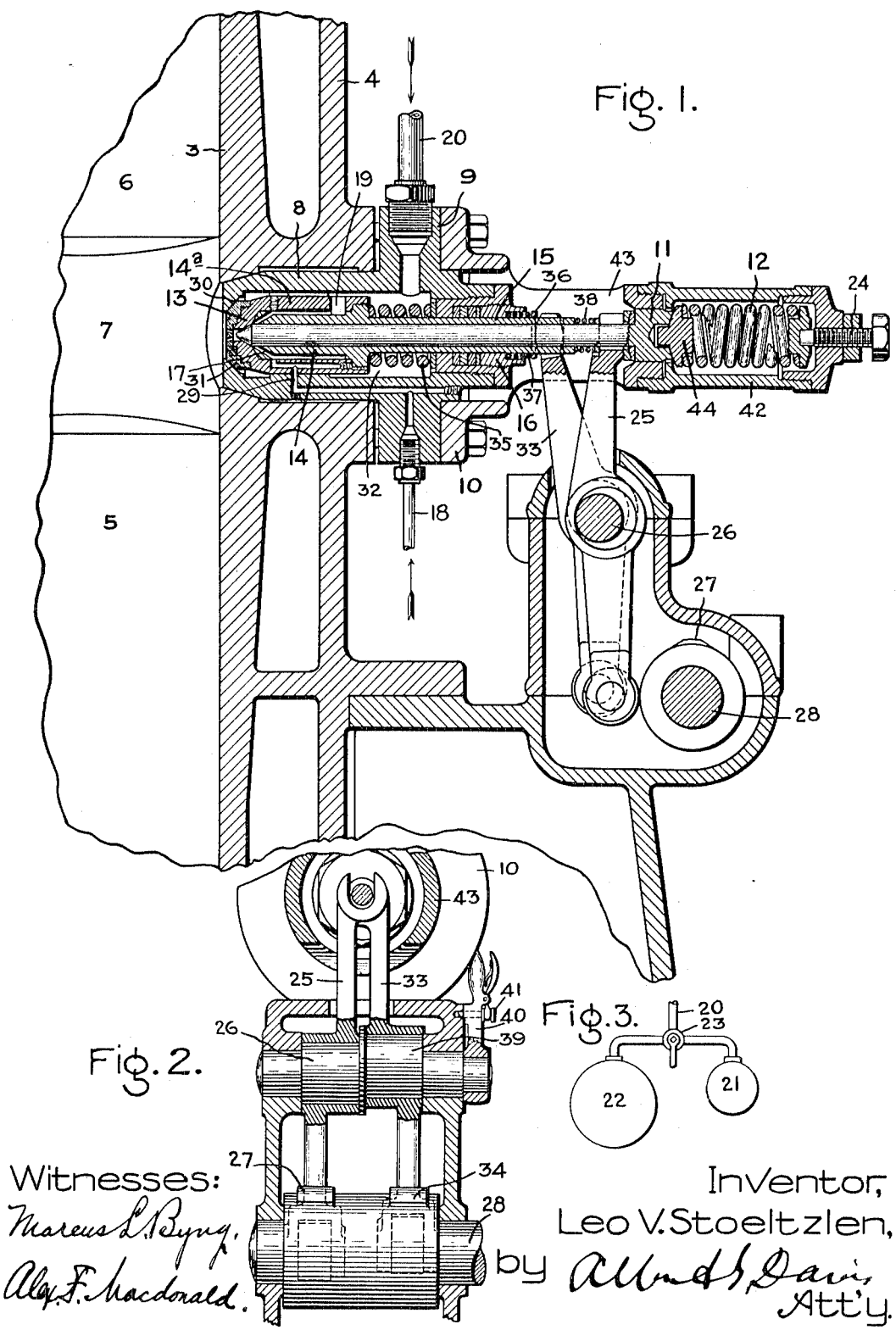
Witnesses:
Marcus L. Byng.
Alex. F. Macdonald.
Inventor,
Leo V. Stoeltzlen,
by Albert G. Davis,
Att'y.

UNITED STATES PATENT OFFICE.

LEO V. STOELTZLEN, OF ERIE, PENNSYLVANIA, ASSIGNOR TO GENERAL ELECTRIC COMPANY, A CORPORATION OF NEW YORK.

FUEL AND STARTING VALVE FOR INTERNAL-COMBUSTION ENGINES.

1,118,379.  Specification of Letters Patent.  Patented Nov. 24, 1914.

Application filed November 7, 1912. Serial No. 729,992.

*To all whom it may concern:*

Be it known that I, LEO V. STOELTZLEN, a citizen of the United States, residing at Erie, in the county of Erie, State of Pennsylvania, have invented certain new and useful Improvements in Fuel and Starting Valves for Internal-Combustion Engines.

The present invention relates to fuel and starting valves for internal combustion engines and in particular to such valves when used with high compression engines wherein a charge of relatively pure air is compressed to a temperature above the igniting temperature of the fuel, after which the fuel in atomized form is injected by means of a blast of air or other suitable means. In an engine of this character, and especially where it is provided with oppositely moving pistons in the same cylinder, it is highly desirable to make as few openings in the cylinder as possible so as to reduce the effects of expansion and contraction, decrease the trouble from leaky joints and cut down the cost of manufacture. Such an engine requires a valve for controlling the admission of fuel and also a valve to control the admission of air or other gas for starting purposes. I have invented or discovered an arrangement of parts whereby the fuel and starting valves can be combined in one unitary structure thereby avoiding numerous objections to existing arrangements and at the same time decreasing the cost of manufacture and operation.

In the accompanying drawing which illustrates one of the embodiments of my invention, Figure 1 is a partial vertical section of an internal combustion engine; Fig. 2 is a detail sectional view of the eccentrically supported pivots of the valve operating levers; and Fig. 3 is a detail of the starting tank and blast bottle.

3 indicates a cylinder of any suitable construction having the usual water jacket 4. Located inside of the cylinder are oppositely moving pistons 5 and 6 which are connected by suitable rods with the main shaft of the engine. Between the pistons is a combustion space 7 in which air is compressed by the pistons to a temperature above igniting temperature of the fuel. Fuel is injected into this space by air under pressure subject to the control of a fuel valve. Compressed air is admitted to the engine for the purpose of starting, said air being under the control of a valve that surrounds the fuel valve.

8 indicates a cylindrical casing that is common to the fuel and starting valves. It is provided at its inner end with a beveled surface that is seated pressure tight in the wall of the cylinder. The casing is also provided with a flange 9 through which securing bolts pass into the cylinder or into a boss formed on the water jacket.

10 indicates the base of a frame that supports and guides the outer end of the fuel valve 11 and supports the coiled compression spring 12 which closes said valve.

Referring first to the fuel valve and its actuating mechanism, said valve is made in the form of a long needle having a beveled inner end which engages a suitable seat 13 on the movable member of the pulverizer. The valve is surrounded by a member 14 that is provided with an elongated sleeve 15 which extends through a suitable stuffing box 16. Screw-threaded to the member 14 and suitably centered thereon with passages between is a tubular member 14ª which in addition to coöperating with the member 14 to form a pulverizer and finely divide the liquid fuel for introduction into the combustion space 7 acts as a starting valve as will appear later. The members 14 and 14ª are provided with suitably arranged fuel and air carrying passages 17 that are in communication with the pipe 18 leading from a fuel pump of any suitable construction. The member 14ª is provided with one or more radial air ports or passages 19 communicating with the fuel passages of the pulverizer. The object of this arrangement is to permit blast air to blow the fuel into the engine against the pressure therein when the valve 11 is opened. Air for this purpose is supplied by the pipe 20 leading from a suitable tank or other receptacle. This pipe should be large enough in diameter to carry the necessary amount of air for starting purposes since it conveys this air as well as the blast air. In this manner I am able to make one pipe serve two purposes. A convenient way to supply air to this pipe is to unite the so-called blast bottle 21, Fig. 3, and the starting tank 22 by a connection, and to this connect the pipe 20. At the junction of said connection and pipe a three-way valve 23 may be provided so that air can be taken either from the starting tank or the blast bottles.

The fuel valve is normally held against its seat by the compression spring 12 whose tension can be adjusted by the screw 24. In order to open the valve at the proper time a lever 25 is provided that is mounted on a pivot 26 that is eccentrically supported. The lower end of the lever is provided with a roller that is adapted to engage the cam projection 27 when the latter is rotated by the cam shaft 28, said shaft being driven in the usual manner. The apparatus described can be used with engines working on the two, four or other cycle plan, and the speed of the cam shaft should be arranged accordingly. As shown the invention is applied to a two cycle engine, and the fuel valve opens once for every revolution of the main shaft.

Referring now to the air starting means, I provide the left hand end of the tubular member 14ª of the fuel pulverizer with a tapered portion which is arranged to be seated on the beveled face 30 formed on the casing or housing 8. The end of the member 14ª may be beveled or it may be provided with a removable beveled part 31 which is beveled on one face and is suitably secured to the member 14ª at the other. The part 31 with the holes therein also forms a flame plate for directing the atomized fuel into the combustion space. It follows that in order to admit air unmixed with fuel to the combustion space for starting purposes it is only necessary to move the member 14ª to the right, said member being normally held in the position shown by the unbalanced pressures existing in the air chamber 32 and in the combustion space 7.

It is to be noted that the tubular member 14ª has a relatively small port 29 which, when the parts are in normal position as shown, registers with the fuel port communicating with the fuel pipe 18. When the starting valve is opened, however, this port is moved to the right and out of register with the fuel passage so that the supply of fuel is cut off. The casing 8 should have suitable internal projections that engage the tubular member 14ª and serve to center it. Between these projections passages are formed to convey air to the engine for starting purposes. As shown the oil passage terminating at the port 29 passes through one of these projections. As before stated the member 14 is provided with a sleeve 15. This sleeve is flattened on opposite sides and embracing the sleeve at the flattened portions and engaging the shoulders thus formed is the forked end of a lever 33. These flat faces engaging the fork prevent the pulverizer from turning and keep the oil ports in line. The lower end of the lever 33 is provided with a roller that is adapted to be moved into and out of engagement with the air starting cam 34 driven by the cam shaft 28. In order to prevent the starting valve from opening accidentally a coiled compression spring 35 is provided and located in the air chamber 32. This spring acts in conjunction with the air pressure from the pipe 20 and normally holds the starting valve on its seat. In order to prevent any vibration of the upper end of the lever 33, due to lost motion, a collar 36 is provided which is pressed against the lever by the coiled compression spring 37. A similar spring 38 performs the same office for the upper end of the lever 25.

Assuming that it is desired to start the engine, the eccentrically supported pivots 26 and 39 of the levers are turned through 90°, more or less, by the handle 40 which is held in either of its two positions by the spring pressed pin 41. Swinging the handle 40 in the proper direction will throw the roller of the fuel lever out of the path of the cam 27 and will throw the lever of the starting valve into position to coöperate with the starting cam 34. The engine is then turned to a position at, or about the dead center and air under suitable pressure is admitted to the pipe 20. By reason of the position of the parts as described the lever 33 will have opened the starting valve against the action of the spring 35 and the spring 12, the latter spring being actuated by reason of the fact that the fuel valve and its seat are moved to the right by the lever 33. After the engine has attained sufficient speed the handle 41 is quickly returned to its normal position which moves the air starting lever out of action. It also moves the fuel valve lever into operative position and thereafter the engine operates in the normal manner.

It will be seen that my improved mechanism has many advantages in the way of simplicity. Only one opening has to be made in the cylinder and only one casing is provided which is common to both the fuel and air starting valves. A part of the pulverizer is utilized to form the starting valve and the coiled compression spring of the fuel valve is utilized as a means for preventing the opening of the starting valve. It should be noted that the springs 12 and 35 are so arranged that whereas the former is compressed both during the starting and normal operating periods the latter is compressed only when the starting valve is open. In other words, the spring 35 holds the starting valve against its seat when the fuel valve is in operation.

The concentric arrangement of the two valves renders them relatively easy to manufacture and at the same time the parts are not liable to be distorted and get out of line. Furthermore, by arranging the parts as shown, one within the other, the diameter of the casing 8 need not be much if any larger than would be necessary if the starting valve had been omitted. The arrangement also has the advantage that the fuel and starting valves together with their casing form a unitary structure which, by removing the retaining bolts, can be easily removed from the engine for inspection or repair. It will also be seen that the fuel valve can be removed for inspection as readily as though the fuel and starting valve means had not been combined. This is accomplished by unscrewing the cage 42 which is carried by the frame 43. It will be noted that the spring plate 44 is slightly larger in diameter than the hole in said cage so that it cannot pass through it. The advantage of this resides in the fact that the cage and spring can be removed and replaced without changing the tension of the spring 12.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with an internal combustion engine of concentrically arranged fuel and starting valves, a casing common thereto, conduits admitting fuel and a starting fluid to the casing, means for actuating the fuel valve, and means for actuating the starting valve.

2. The combination with an internal combustion engine of a member that acts as a fuel pulverizer and also as a starting valve, a casing therefor, means for introducing fuel and a starting fluid to the casing, and means for moving said member when it is desired to admit the starting fluid to the engine.

3. The combination with an internal combustion engine of a casing that communicates with the cylinder of said engine, a member located therein which is provided with fuel and air passages and forms a valve, a fuel valve seat, a fuel valve that extends into the member and engages the seat, conduits admitting fuel and a starting fluid to the casing, means for moving the said member to admit the starting fluid to the engine, and means for actuating the fuel valve for normal operation.

4. The combination with an internal combustion engine of a casing opening into its cylinder and having a valve seat, a member located therein which is provided with passages for fuel and air and a fuel valve seat, said member also forming a valve which engages the seat in said casing, a fuel valve adapted to enter the member and engage the seat therein, means for normally holding the member against the valve seat in the casing, conduits admitting fuel and air to the casing, and means for moving the fuel valve and said member.

5. In combination, a casing having a valve seat, a hollow member containing fuel and air passages and having a valve seat, said member forming a valve, a spring that normally holds the member against its seat, a fuel valve, a spring for urging the valve toward its seat, a lever for moving the fuel valve against the action of its spring, and a second lever for actuating said member against the action of both springs.

6. In combination, a casing having a valve seat, a hollow member containing fuel and air passages and having a valve seat, said member forming a valve that is subjected to unbalanced pressures and tends to close, a flame plate carried by the said member, a lever for moving the member from its seat, a fuel valve that engages the seat in the member, a lever for actuating the fuel valve, eccentrically supported pivots for the levers, means for turning the pivots, and conduits admitting fuel and a starting fluid to the casing.

7. In combination, a casing having a valve seat, a hollow member having fuel and air passages, said member also forming a valve to engage said seat, a sleeve that is attached to the member, a lever that engages the sleeve for actuating the member for starting purposes, a fuel valve that extends through the sleeve and seats on said member, a lever that actuates the fuel valve, adjustable fulcra for the levers, means within the casing to hold said member against its seat, and a means external of the casing to hold the fuel valve on its seat.

8. The combination with an internal combustion engine, of a pulverizing means, a casing therefor opening into the engine cylinder, a valve to regulate the passage of fuel through said means, an actuator for moving the pulverizing means bodily to admit fluid to the cylinder for starting purposes, and a device driven by the engine for actuating the valve.

9. The combination with an internal combustion engine of a casing opening into its cylinder, a pulverizing means located in the casing which also acts as a starting valve, a valve for regulating the admission of fuel that is located in the pulverizing means and is concentric therewith, a device for moving the pulverizing means away from its seat, and means for preventing fuel from entering the engine when the starting valve is open.

10. The combination with an internal combustion engine of a casing opening into its cylinder, a pulverizing means located in the casing, a valve within the pulverizer controlling the passage of fuel therethrough, a means for opening and closing the valve for normal operation, a starting valve concentric with the fuel valve, means for moving the starting valve to admit fluid under pressure to the cylinder for starting purposes.

11. The combination with an internal combustion engine of a casing communicating with the cylinder and having a valve seat, a starting valve in the casing which engages said seat, said starting valve also having a valve seat, a fuel valve engaging the second named seat and means whereby either of said valves may be removed from its seat without moving the other from its seat.

12. The combination with an internal combustion engine of a casing communicating with the cylinder and having a valve seat, a fuel valve, a starting valve concentric with the fuel valve and having a seat therefor, said starting valve engaging the valve seat in the casing and means whereby either of said valves may be moved from its seat without moving the other from its seat.

In witness whereof, I have hereunto set my hand this 4th day of November, 1912.

LEO V. STOELTZLEN.

Witnesses:
 HERMANN LEMP,
 OTTO F. PERSSON.